United States Patent Office 3,039,693
Patented June 19, 1962

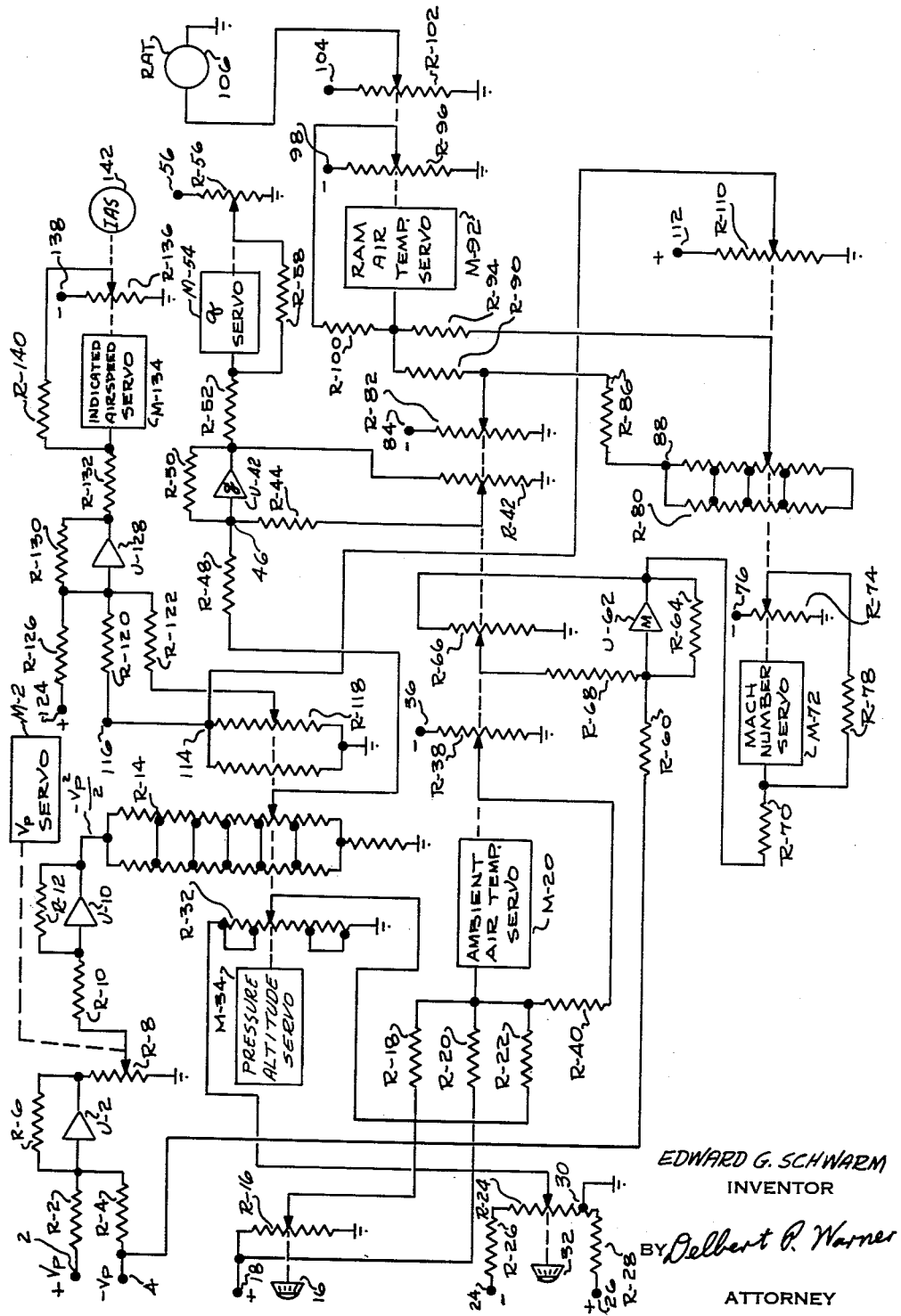

3,039,693
COMPUTATION OF MACH NUMBER FOR A FLIGHT SIMULATOR OPERATING IN A NON-STANDARD ATMOSPHERE
Edward G. Schwarm, Chenango Bridge, N.Y., assignor to Link Aviation, Inc., Binghamton, N.Y., a corporation of New York
Filed June 19, 1958, Ser. No. 743,164
5 Claims. (Cl. 235—184)

The present invention relates to flight simulators and more particularly to means for computing Mach number and functions dependent on Mach number for use in such simulators.

Prior art simulators were designed primarily to simulate the behaviour of slow flying aircraft, and computation of Mach number and functions dependent upon Mach number has not been necessary to the degree of accuracy with which it is necessary for faster aircraft.

In those prior art computers in which the simulated flight speed has approached the speed of sound, environmental conditions of a standard ICAO or NACA day have been simulated, and no attempt has been made to provide realistic simulation of the conditions existing in a non-standard atmosphere.

It is a primary object, therefore, of this invention to provide means for computing Mach number in a simulator in which the simulation is based upon a non-standard atmosphere.

It is another object of this invention to accurately simulate the characteristics of aircraft which fly at speeds approaching or exceeding the speed of sound.

It is an additional object of this invention to provide computer functions proportional to Mach number such as ram air temperature and indicated airspeed.

It is still another object of this invention to simulate the effects that air temperature and air pressure produce on aircraft without assuming standard atmospheric conditions.

It is yet another object of this invention to provide realistic instrument readings in a simulator in those cases in which the simulator is capable of simulating the behaviour of high speed aircraft.

The foregoing objects and others ancillary thereto I prefer to accomplish as follows:

According to a preferred embodiment of my invention, I provide input voltages which are proportional to airspeed and modify them by computer procedures to provide a voltage proportional to airspeed squared divided by 2 or $$\frac{V_p{}^2}{2}$$

I provide other input voltages proportional to such factors as selected sea level temperature, an absolute temperature conversion factor, and a selected lapse rate factor. The selected lapse rate factor is then modified in accordance with simulated altitude, and summed together with the sea level temperature and the absolute temperature conversion factor to provide simulated ambient air temperature. This value is then used in conjunction with airspeed to compute Mach number. Mach number is then used along with the value of $$\frac{V_p{}^2}{2}$$

and/or temperature to compute such functions as ram air temperature and indicated airspeed.

The novel features that I consider characteristic of my invention are set forth with particularity in the appended claims. The invention itself, however, both as to its organization and its method of operation, together with additional objects and advantages thereof, will best be understood from the following description of a specific embodiment, when read in connection with the accompanying drawing, in which is shown a schematic diagram of an exemplary embodiment of the instant invention.

Turning now to the FIGURE, terminals 2 and 4 have voltages impressed on them proportional to $V_p$ and $-V_p$, respectively. These voltages are computer voltages, representing airspeed, which are normally available in flight trainers, where they may have been derived in any of the conventional ways. The respective positive and negative voltages representative of airspeed are fed through the summing resistors R–2 and R–4 to the input of the amplifier U–2 which has a resistor R–6 in its feedback circuit. The resistors R–2, R–4, and R–6 may be scaled in such a way that the output of the amplifier U–2 is a voltage proportional to $$\frac{V_p}{2}$$

This voltage $$\frac{V_p}{2}$$

is impressed across a potentiometer R–8. An airspeed servo M–2 may then be used to position the wiper arm of the potentiometer R–8 in such a way that the potential appearing on the wiper arm is proportional to $$\frac{V_p{}^2}{2}$$

The apparatus for producing a voltage proportional to $V_p{}^2$, described in the preceding paragraph, is more fully explained in patent No. 2,904,253 entitled "Analog Computer" of Edward G. Schwarm and Carrol L. Duren, which was filed on January 4, 1957, and which has been assigned to the same assignee as the present invention. In that patent the airspeed servo is used to derive the $-V_p$ value as well as to position the potentiometer arm.

The exact manner in which $V_p{}^2$ is produced is not critical to this invention, and more conventional squaring apparatus using only the positive value of $V_p$ as an input to the amplifier U–2 and with a positive servo to position the wiper arm might be used to produce the required airspeed squared quantity. The particular embodiment shown has been chosen because of the increased accuracy attained in comparison with the prior art devices.

The output potential appearing on the wiper arm of potentiometer R–8 is fed through a resistor R–10 to an amplifier U–10, which is provided with a feedback resistor R–12, and which reverses the polarity of $$\frac{V_p{}^2}{2}$$

from positive to negative. The negative output of the amplifier U–10 is impressed across a padded potentiometer R–14. The potential applied on the wiper arm of the potentiometer R–14 will thus be a function of the position of the potentiometer wiper arm and of the potential across the potentiometer R–14. This relationship may be expressed in the form of an equation $$\frac{-V_p{}^2 h}{2}$$

where $$\frac{-V_p{}^2}{2}$$

is the voltage applied across the potentiometer R–14 and $h$ represents the position of the wiper arm. $V_p$ represents air-speed and $h$ stands for pressure altitude.

One of the quantities which is used in computing the dynamic pressure exerted on a simulated airplane is the temperature of the air surrounding the simulated airplane. This temperature may be determined by taking into account the sea level temperature, the temperature lapse rate, and the altitude of the simulated airplane. The same computations may be utilized to determine the dynamic pressure on an actual airplane.

In the case of a simulator, as shown in the FIGURE, an arbitrarily selected sea level temperature may be chosen by an instructor who turns a knob 16 to position the wiper arm of a potentiometer R–16 to derive a voltage of desired magnitude. Potentiometer R–16 is excited at terminal 18 by a constant potential from the computer power supply (not shown). The output potential appearing on the wiper arm of potentiometer R–16 is applied to ambient air temperature servo M–20 through scaling resistor R–18. A potential proportional to the constant 273.18° C. is applied, via resistor R–20, to ambient air temperature servo M–20 to supply a correction to make the shaft output position of servo M–20 proportional to the simulated absolute temperature in degrees Kelvin.

The potential supplied to ambient air temperature servo M–20 through sealing resistor R–22 is proportional to the simulated lapse rate ($a$) occurring in the atmosphere multiplied by the simulated pressure altitude ($h$). The winding of potentiometer R–24 is excited by positive and negative voltages from terminals 26 and 24, respectively, applied to the winding via resistors R–28 and R–26, and a point 30 on the winding of potentiometer R–24 is grounded. The output voltage on the wiper arm of potentiometer R–24 is determined by the voltage across the resistor R–24 and the position of the wiper arm, in response to the adjustment of a control knob 32, which may be under the control of a trainer instructor. The potential on the wiper arm of the potentiometer R–24 is applied to excite potentiometer R–32, which has jumpers on its winding to provide a non-linear characteristic simulating variations in lapse rate ($a$) with changes in pressure ratio which occur with changes in simulated altitude. The pressure altitude servo M–34 is a conventional aircraft trainer servo and has appropriate input voltages (not shown) applied to it to cause its shaft position to be determined in accordance with the pressure altitude.

The voltages applied across resistors R–18, R–20, and R–22 are applied to the input terminal of the ambient air temperature servo M–20 and summed at that point with the negative position feedback voltage fed through resistor R–40 to position the servo so that its output position is proportional to simulated ambient air temperature. The operation of this apparatus may be clearer if one considers the following equation:

$$T_o + 273.18 + ah = T_a \qquad (1)$$

where $T_o$ is the sea level temperature in degrees centigrade,
273.18 is the correction necessary to change from centigrade to absolute degrees Kelvin,
$a$ represents the temperature lapse rate,
$h$ is the pressure altitude,
$T_a$ is the ambient or outside air temperature, and the scaling resistors of the apparatus used to simulate this equation are equal to each other.

Equation 1 illustrates that when the sum of the voltages applied to the input terminal of the ambient air temperature servo M–20 is zero, the shaft of the servo will be positioned in accordance with the ambient air temperature. In this way, a shaft position proportional to ambient air temperature is provided to actuate any desired computer apparatus. The input potentials to position servo mechanism M–34 are scaled in conventional manner.

The shaft of ambient air temperature servo M–20 positions the wiper arm of potentiometer R–42 so that the output of dynamic pressure amplifier U–42 is multiplied by the ambient air temperature, and the voltage appearing on the wiper arm of the potentiometer R–42 is fed back through a resistor R–44 to the input terminal 46 of the dynamic pressure amplifier U–42. The pressure altitude servo M–34 positions the wiper arm of the potentiometer R–14 through its shaft in a manner such that the voltage impressed on the terminal 46 through a resistor R–48 is proportional to $$\frac{V_p^2}{2}$$

times the pressure altitude $h$. A resistor R–50 serves as the conventional feedback resistor for operational amplifier U–42.

In order to make the operation of the dynamic pressure amplifier U–42 and its associated circuits clearer, the reader's attention is invited to the following considerations:

According to the ideal gas law:

$$\rho = \frac{P}{RT} \qquad (2)$$

where $\rho$ is density,
P is pressure,
T is the absolute temperature, and
R is a constant.

In order to obtain density in slugs per cubic foot, where pressure is expressed in pounds per square foot and temperature in degrees Kelvin, R must be equal to $3.08965 \times 10^3$.

Combining Equations 1 and 2 above, the following equation may be derived:

$$\rho = \frac{P}{R(T_o + 273.18 + ah)} \qquad (3)$$

Using the relation for dynamic pressure:

$$q = \tfrac{1}{2} \rho V_p^2 \qquad (4)$$

where $V_p$ is airspeed and combining Equations 3 and 4, the following equation is derived:

$$q = \frac{P V_p^2}{2R(T_o + 273.18 + ah)} \qquad (5)$$

This equation shows the interrelationship of some of the factors considered in connection with this invention. The pressure (P) has not been directly involved in the circuitry, but this is accounted for when we consider that pressure P is a function of pressure altitude $h$, which is represented by the position of the shaft of the pressure altitude servo M–34. This being so, Equation 5 may be rewritten with $f_1(h)$ substituted for (P) as follows:

$$q = \frac{f_1(h) V_p^2}{2R(T_o + 273.18 + ah)} \qquad (6)$$

Further analysis of the illustrated embodiment of this invention indicates that the sum of the currents applied at the input terminal of the dynamic servo amplifier U–42 is as follows:

$$\frac{-V_p^2 f_1(h)}{2R_{48}} + \frac{q T_a}{R_{44}} + \frac{q}{R_{50}} = 0 \qquad (7)$$

where $R_{44}$, $R_{48}$, and $R_{50}$ represent the resistances of resistors R–44, R–48 and R–50 respectively.

Equation 7 can easily be reduced to the following form:

$$q = \frac{V_p^2 f_1(h)}{2R_{48}} \cdot \frac{1}{\dfrac{T_a}{R_{44}} + \dfrac{1}{R_{50}}} \qquad (8)$$

The quantity $$\frac{1}{R_{50}}$$

generally is small enough to be neglected when compared with $$\frac{T_a}{R_{44}}$$

so that Equation 8 can be rewritten as follows:

$$q = \frac{f_1(h) V_p^2 R_{44}}{2 R_{48} T_a} \quad (9)$$

Equation 9 may be reduced to the form of Equation 6 by substituting a constant $$\frac{1}{R}$$

for $$\frac{R_{44}}{R_{48}}$$

and the equality in Equation 1 for $T_a$.

Servo M-54 may be operated from the output voltage of the dynamic pressure amplifier U-42 through scaling resistor R-52. Position feedback voltage for the servo may be provided from the wiper arm of potentiometer R-56, which is suitably energized at its terminal 56, through a resistor R-58. The shaft position provided by the servo M-54 may be linked with a suitable meter (not illustrated) to show dynamic pressure and may be connected wherever a shaft position proportional simulated dynamic pressure is needed. Additional details as to the operation of the dynamic pressure circuitry of this invention are available in a patent application No. 743,163 of Laurence E. Fogarty and Edward G. Schwarm entitled "Computation of Dynamic Pressure in a Flight Simulator, filed on June 19, 1958, and assigned to the same assignee as the present application.

Once a servo shaft position proportional to ambient air temperature has been established, as by means of servo M-20, it is possible to compute Mach number either for a simulator or for an airplane in accordance with this invention. The input $-V_p$ on terminal 4 of the drawing may be applied through resistor R-60 to the input of Mach number summing amplifier U-62, the output terminal of which is connected to its input terminal through a feedback resistor R-64. A potentiometer R-66 (wound to provide a squareroot function) and a scaling resistor R-68 are connected as shown. The wiper arm of potentiometer R-66 is positioned by the output shaft of the ambient air temperature servo M-20 to provide a voltage which is a function of $\sqrt{T_a}$. The scale factors of the resistors R-60, R-64 and R-68 are chosen such that the output of Mach number amplifier U-62 is proportional to true Mach number, considering airspeed and the absolute temperature, in accordance with the following relationships:

$$a = (\gamma R T_a)^{1/2} \quad (10)$$

where $a$ is the speed of sound,
$\gamma$ is the ratio of specific heat at constant volume versus constant pressure (a constant of value 1.405),
R is the gas constant, and
$T_a$ is the ambient air temperature in degrees Kelvin.

If $\sqrt{\gamma R}$ of Equation 1 is chosen as a constant equal to 65.88; a relationship which applies when $a$ is in ft./sec. and $T_a$ in °K., then Equation 1 reduces the following:

$$a = 65.88 T_a^{1/2} = \frac{T_a^{1/2}}{0.01518} \quad (11)$$

By definition:

$$M = \frac{V_p}{a} \quad (12)$$

where

M is Mach number,
$V_p$ is true airspeed in ft./sec., and
$a$ is the speed of sound at the specified temperature.

Substituting Equation 11 in Equation 12

$$M = \frac{0.01518 V_p}{T_a^{1/2}} \quad (13)$$

From Equation 13, the quantities which must be considered to compute Mach number are apparent. It becomes apparent also that Mach number amplifier U-62 may be used to determine the interrelationship between these quantities. This follows from the consideration that the sum of the inputs to amplifier U-62 equals:

$$\frac{-V_p}{R_{60}} + \frac{M(T_a^{1/2})}{R_{68}} + \frac{M}{R_{64}} = 0 \quad (14)$$

where $R_{60}$, $R_{64}$, and $R_{68}$ are the resistances of resistors R-60, R-64 and R-68 respectively.

From Equation 14, dropping the term $$\frac{M}{R_{64}}$$

as insignificant $$M = \frac{V_p R_{68}}{(T_a^{1/2}) R_{60}} \quad (15)$$

Scaling resistors R-68 and R-60 can readily be scaled so that Equation 15 reduces to the form of Equation 13.

The voltage proportional to Mach number may be applied through resistor R-70 to Mach number servo M-72 to position the servo shaft and the wiper arm of a potentiometer R-74. Potentiometer R-74 has a negative potential applied to its terminal R-76 to provide a position feedback voltage through feedback resistor R-78 to the input terminal of Mach number servo M-72.

The output shaft of Mach number servo M-72 may also be used to position the wiper arm of potentiometer R-80. The potential applied to potentiometer R-80 is a function of the ambient air temperature and is determined by the position of the wiper arm (positioned by the ambient air temperature servo M-20) of potentiometer R-82, the winding of which is energized by its negative potential applied at its terminal 84. The potential appearing on the wiper arm of resistor R-82 is then applied through resistor R-86 to terminal 88 of padded potentiometer R-80, and applied via resistor R-90 to the input terminal of ram air temperature servo M-92.

The potential appearing on wiper arm of the potentiometer R-80, which is a function of the ambient air temperature $T_a$ and the Mach number M or $f(T_a, M)$ is applied through resistor R-94 to the input terminal of ram air temperature servo M-92. The ram air temperature servo M-92 positions the wiper arm of potentiometer R-96, the winding of which is excited by a negative supply potential to provide a position feedback voltage through scaling resistor R-100 to the input of ram air temperature servo M-92. The shaft of servo M-92 also positions the wiper arm of potentiometer R-102, the winding of which is energized by a constant potential applied to its terminal 104 so that the voltage appearing on the wiper arm will vary in accordance with simulated ram air temperature to provide an indication on meter 106 proportional thereto.

The output shaft of the Mach number servo M-72 also serves to position the wiper arm of potentiometer R-110, which has a positive potential applied to terminal 112 to provide a positive potential proportional to Mach number. The Mach number potential is then applied to terminals 114 and 116 of padded potentiometer R-118 and scaling resistor R-120, respectively. The position of the shaft of the pressure altitude servo M-34 is such that the voltage proportional to Mach number appearing across the padded potentiometer R-118 is multiplied by the pressure altitude. The resulting voltage is then applied through resistor R-122 to the input terminal of an indicated airspeed summing amplifier U-128. A positive fixed potential is applied to terminal 124 and through resitsor R-126 to the input terminal of amplifier U-128.

Resistor R-130 provides the usual feedback path for the amplifier U-128.

The output of amplifier U-128 may be applied through resistor R-132 to the input terminals of indicated airspeed servo M-134, which will then position its output shaft in accordance with indicated airspeed. The indicated airspeed output shaft can be used to position the wiper arm of potentiometer R-136, which has a negative potential applied to its terminal 138, in such a way that it provides a position feedback voltage through resistor R-140 to the input of servo M-134. The output shaft of indicated airspeed servo M-134 may be used to position indicated airspeed meter 142.

It is evident that the output voltages of the amplifiers illustrated in connection with this invention may be used elsewhere as sources for voltages proportional to the functions generated. All that is necessary is a connection in each instance to suitable isolating means and no attempt has been made herein to illustrate all the possibilities.

The shaft positions generated by the servo systems illustrated in connection with this invention may be used to position the indicators on meters, the wiper arms of potentiometers, or any other apparatus in which the function represented is useful as a shaft position.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. Aircraft flight trainer apparatus for computing simulated Mach number of a simulated aircraft in simulated non-standard atmosphere conditions, comprising, in combination: a first instructor-operated control means for deriving a first potential commensurate with a desired simulated temperature at a reference altitude; a second instructor-operated control means for deriving a second potential commensurate with a desired simulated temperature lapse rate; altitude servo means connected to modify said second potential in accordance with a function of simulated pressure altitude of a simulated aircraft to provide a third potential; a position servomechanism connected to said first and third potentials and operative to provide a simulated ambient air temperature shaft position in accordance with the sum of said first and third potentials; means for providing a fourth potential commensurate with simulated true airspeed of said simulated aircraft; and a potential division circuit connected to be adjusted by said shaft position and to provide an output potential commensurate with the ratio between said fourth potential and said shaft position.

2. Apparatus according to claim 1 in which said potential division circuit comprises an amplifier connected to receive said fourth potential and a feedback potential and to provide said output potential; and a potentiometer electrically connected to be excited by said output potential and mechanically connected to be adjusted by said position servo mechanism to derive said feedback potential.

3. Apparatus according to claim 1 having a second potentiometer connected electrically to be excited in accordance with said output potential and connected mechanically to said altitude servo means to derive a fifth potential; an indicated airspeed servo means responsive to said fifth potential and said output potential for providing a shaft position commensurate with simulated indicated airspeed of said aircraft; and an indicating means connected to be operated by said indicated airspeed servo means.

4. Apparatus according to claim 1 having a first potentiometer adjusted by said shaft position and operative to provide a fifth potential; a second potentiometer positioned in accordance with a function of said output potential and excited by said fifth potential for deriving a sixth potential; and a further servomechanism responsive to said fifth and sixth potentials and operative to provide a shaft position commensurate with simulated ram air temperature at said simulated aircraft; and a ram air temperature indicator operated by said further servomechanism.

5. Apparatus according to claim 1 having means for deriving a fifth potential commensurate with the square of simulated true airspeed of said simulated aircraft; a potentiometer electrically connected to be excited in accordance with said fifth potential and mechanically positioned by said altitude servo means to derive a sixth potential; and a second potential division circuit responsive to said sixth potential and said shaft position to provide a simulated dynamic pressure potential.

References Cited in the file of this patent

UNITED STATES PATENTS

| | | |
|---|---|---|
| 2,658,673 | Darlington | Nov. 10, 1953 |
| 2,784,501 | Stern et al. | Mar. 12, 1957 |
| 2,798,308 | Stern et al. | July 9, 1957 |
| 2,858,623 | Stern et al. | Nov. 4, 1958 |

OTHER REFERENCES

Electronic Instruments (Greenwood et al.), 1948, pp. 131–135.

Project Cyclone Symposium I, page 122, 1955.